June 11, 1929. M. F. CARR 1,716,483
LUBRICATING APPARATUS
Filed April 15, 1926 5 Sheets-Sheet 1

Inventor:
Moses F. Carr,
by Emery, Booth, Janney & Varney Attys.

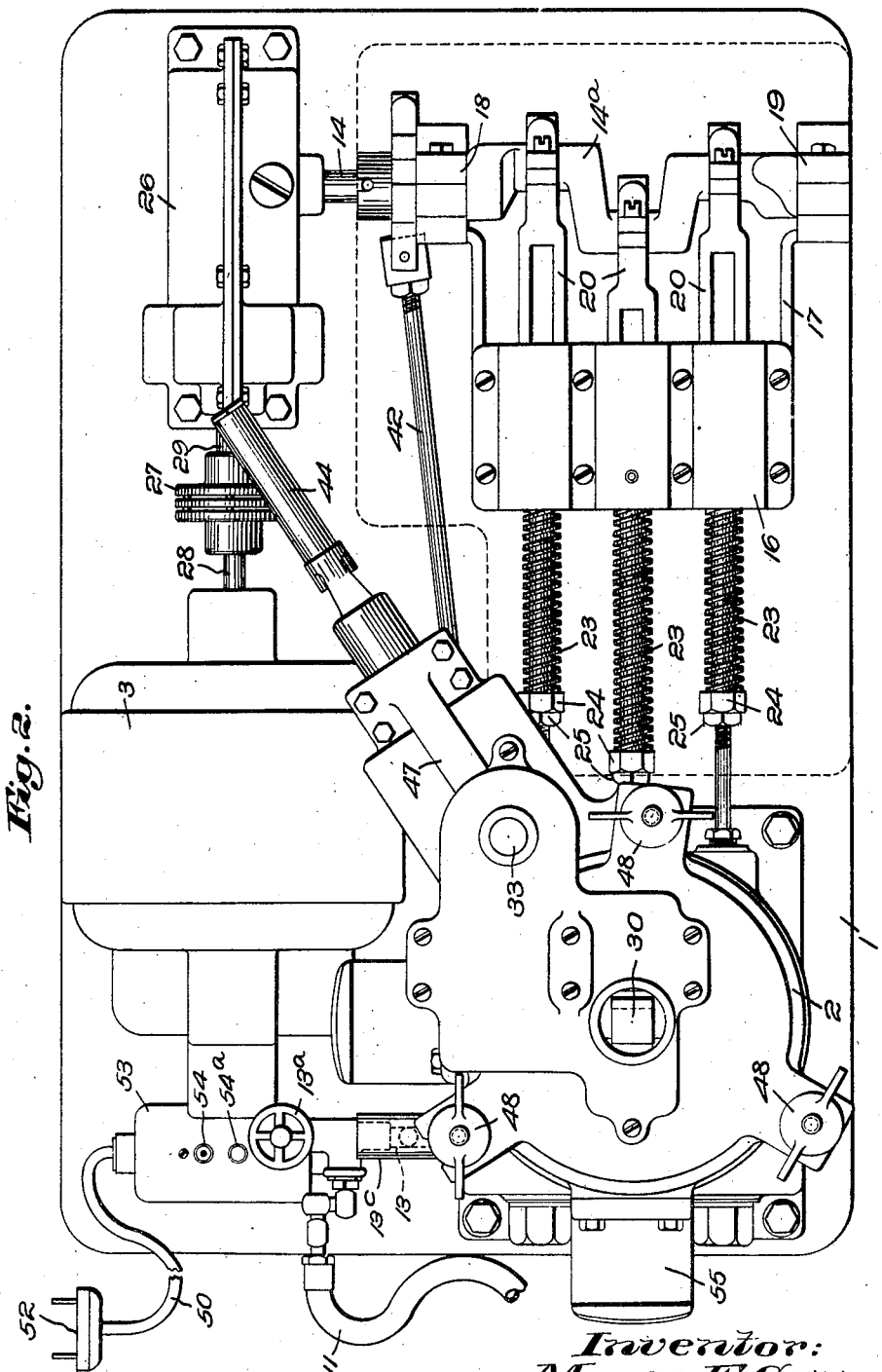

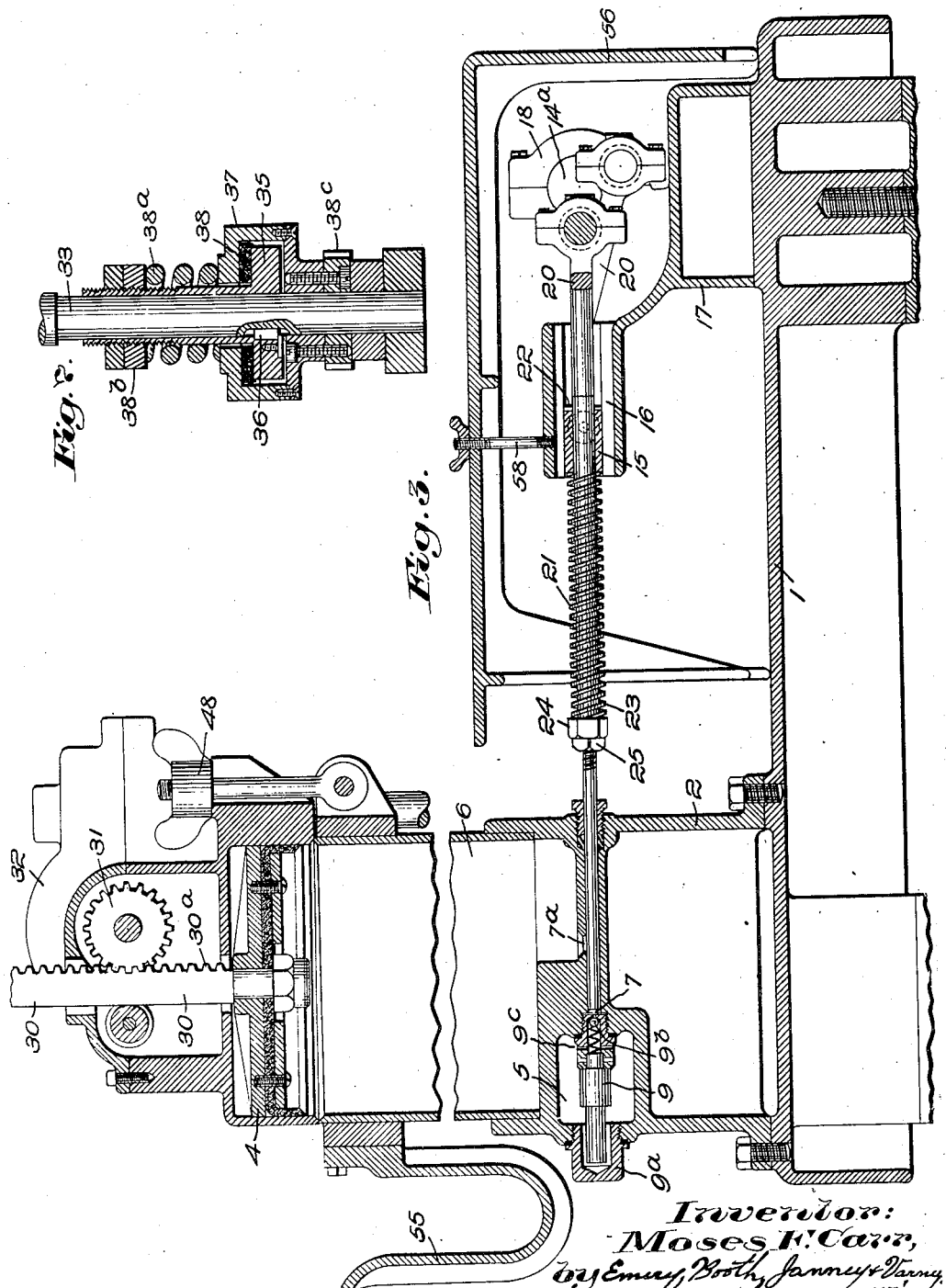

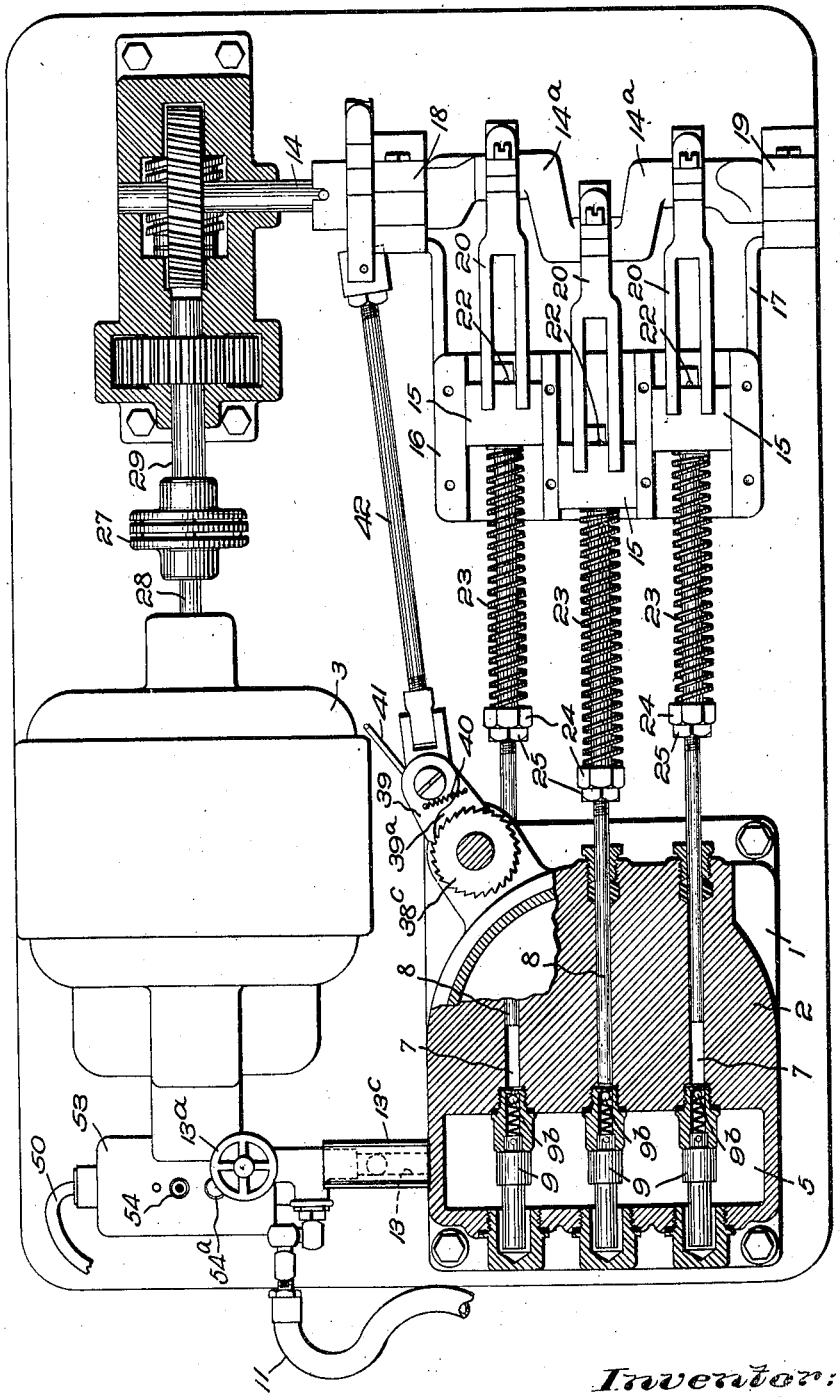

June 11, 1929.   M. F. CARR   1,716,483
LUBRICATING APPARATUS
Filed April 15, 1926   5 Sheets-Sheet 5
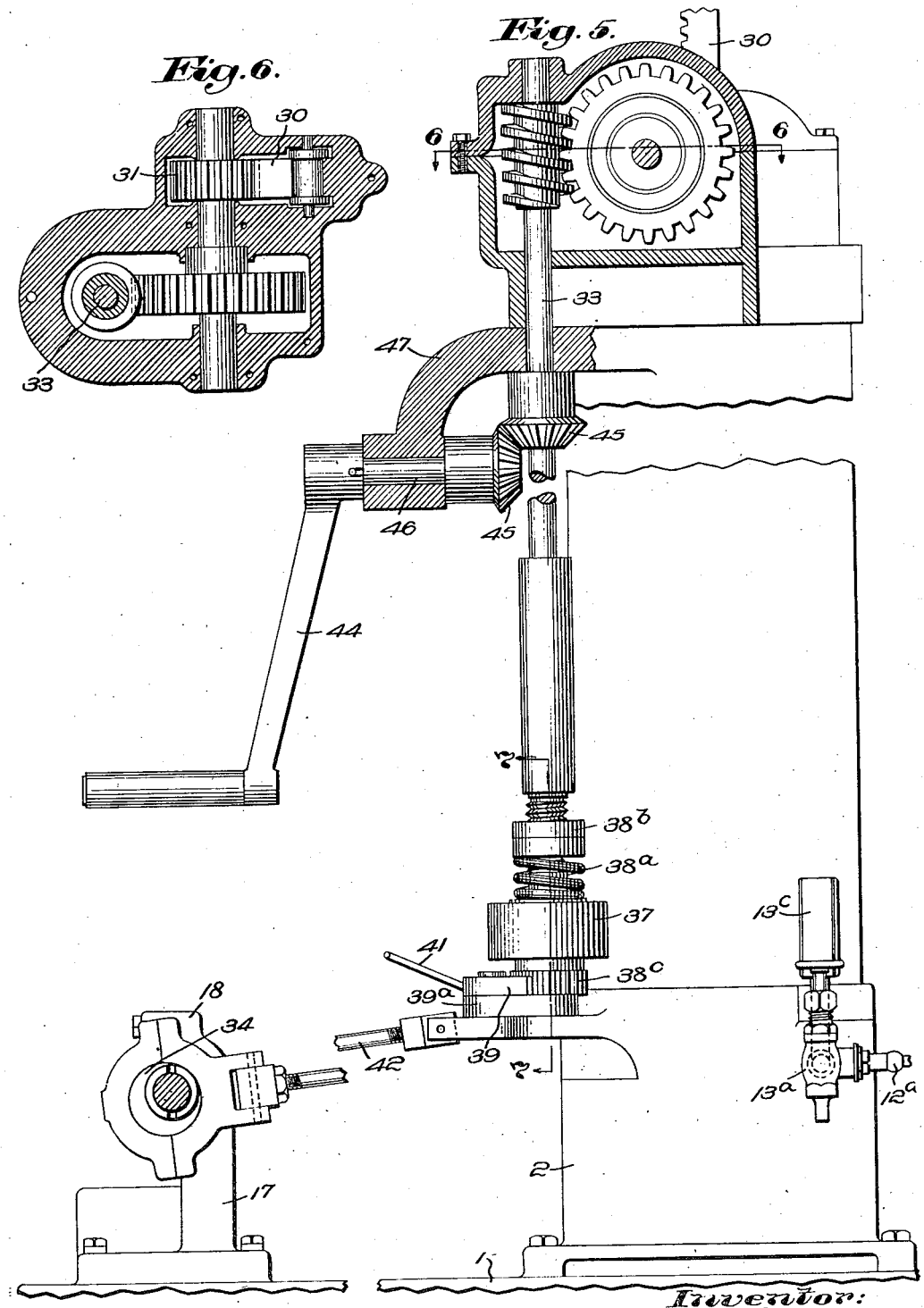

Patented June 11, 1929.

1,716,483

UNITED STATES PATENT OFFICE.

MOSES F. CARR, OF LEXINGTON, MASSACHUSETTS, ASSIGNOR, BY MESNE ASSIGNMENTS, TO ALEMITE MANUFACTURING CORPORATION, OF CHICAGO, ILLINOIS, A CORPORATION OF DELAWARE.

LUBRICATING APPARATUS.

Application filed April 15, 1926. Serial No. 102,319.

This invention aims to provide improvements in lubricating apparatus.

In the drawings, which illustrate a preferred embodiment of my invention:—

Fig. 2 is a plan view of the apparatus, the cover plate for the pump operating mechanism being shown in dotted lines;

Fig. 3 is a section through the tank and part of the operating mechanism, parts being broken away and parts being in elevation;

Fig. 4 is a plan section of the apparatus showing parts in elevation and parts in section;

Fig. 5 is a side elevation showing parts of the driving mechanism for operation of the piston in the tank, part of the housing being in cross-section;

Fig. 6 is a section on the line 6—6 of Fig. 5, showing the driving mechanism in elevation; and Fig. 7 is a section through the friction-driving mechanism taken on the line 7—7 of Fig. 5.

Figure 1:
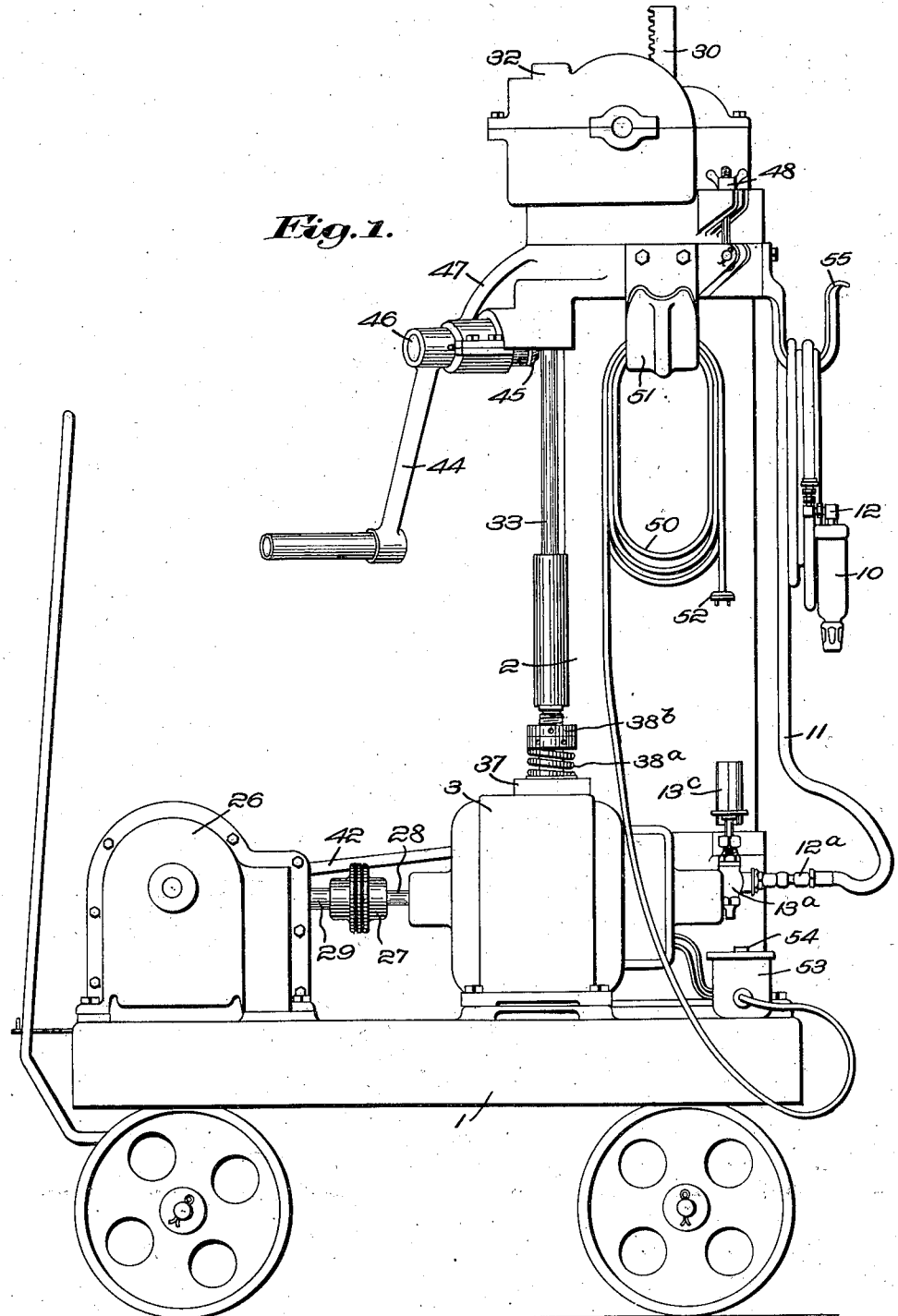
Figure 1 is an elevation of a preferred form of power-operated lubricant-expelling apparatus.

Referring to the embodiment of my invention illustrated in the drawings, I have shown a portable lubricant expelling device particularly, though not exclusively, useful as a garage tank for use when it is desirable to lubricate the bearings of motor vehicles. The device is equally useful for providing quick and simple means for lubricating the bearings of machinery. The apparatus includes a wheeled truck upon which is mounted a tank large enough to hold a quantity of lubricant sufficient for the lubrication of a large number of bearings. The truck also carries means for forcing the lubricant from the tank, power means for operation of the aforesaid means and the tank is equipped with conduit and coupling means for conveying the lubricant from the tank to the parts to be lubricated. Safety means are provided to prevent bursting of the tank if the operator inadvertently fails to stop the power means which might otherwise build up a pressure sufficient to do great damage to the entire apparatus. A handle is secured to the truck at one end, as shown in Fig. 1, by which the apparatus may be drawn about.

From the above, it will be readily understood that the apparatus illustrated in the drawings and more fully hereinafter described is practically fool-proof in operation and its use will reduce labor expenses over the hand method of lubrication. By operating the apparatus by power, one person can operate the entire apparatus as well as to lubricate the parts to be lubricated, whereas in other known types of systems for similar use at least two persons are required to give efficient service, one person to operate the means by which the lubricant is placed under pressure and the other for connecting and disconnecting the discharge nozzle with nipples on the parts to be lubricated.

The wheeled truck 1 may be of any suitable construction which will permit the tank 2, the electric motor 3, and the driving mechanism to be bolted or otherwise secured thereto.

The tank 2 is provided with a piston 4 operated by a suitable mechanism more fully hereinafter described. At the lower end of the tank is provided a high pressure chamber 5 connected with the lubricant supply cylinder 6 of the tank 2 by a plurality of passages 7 communicating with the cylinder 6 through ports 7ª as shown in Fig. 3. These passages constitute cylinders in which are operated, by a suitable mechanism, a plurality of pistons 8 to force lubricant from the passages into the high pressure chamber to build up a relatively high pressure.

A valve carrying part 9 is screwed into the end of each cylinder 7 and may be inserted or removed from place by removing a plug 9ª secured to the outside casing of the tank 2 as shown in Figs. 3 and 4. Each valve carrying part presents a ball valve 9ᵇ which prevents return of lubricant from the chamber 5 to the cylinders 7. The lubricant passes the ball checks and then out through ports 9ᶜ in the sides of the valve carrying parts into the chamber 5.

The lubricant in the high pressure chamber 5 is supplied to the nozzle, gun or other suitable device 10 (Fig. 1) by the flexible hose 11 connected at one end with the gun 10 by a universal joint 12 and at the other end with a pipe 13 through a second universal joint 12ª. The pipe 13 is in direct communication with the chamber 5 (Fig. 4) and is provided with a valve 13ª through which lubricant may be drawn out of the chamber if for some reason it is desirable to have a supply of lubricant other than through the hose 11.

While I have shown three pistons 8 for compressing the lubricant in the chamber 5, this number may be increased or decreased as found necessary. All of the pistons 8 are driven from a shaft 14 connected to a crank shaft 14$^a$ so that some of the pistons are always forcing lubricant into the chamber 5. Instead of connecting the pistons directly to the shaft 14$^a$, I provide a plurality of blocks 15 (one for each piston) slidably mounted in a support 16 formed integral with the part 17 providing the bearings 18 and 19 for the crank shaft 14$^a$. To these blocks are secured connecting rods 20, the other ends of which are secured to the crank parts of the shaft 14$^a$, as show in Fig. 4. The other ends of the stems 21 of the pistons 8 pass through the blocks, but are not rigidly secured thereto. However, pins 22 (Fig. 3) are affixed to the stems 21 to permit the blocks to move the pistons 8 in one direction. Each piston stem is provided with a spring 23 interposed between its block and a nut 24 secured to the stem. A lock nut 25 prevents turning of the nut 24 after the desired tension on the spring is determined.

Between the motor 3 and the shaft 14, I have provided a suitable reduction gearing enclosed in a housing 26 secured to the truck 1, as shown in Fig. 4. A universal joint 27 is interposed between the shaft 28 of the motor and the shaft 29 leading into the housing 26, thereby to permit alignment of the parts of the driving mechanism.

The reduction gearing may include any suitable gears which will reduce the ratio of the speed of the motor to such a degree that the turning of the crank-shaft is relatively slow as compared with the turning of the shaft 28 of the motor.

The means used for operating the piston 4 in the tank includes a stem 30 carried by the piston 4 and extending through the top of the tank. The stem 30 has rack teeth 30$^a$ cut thereon to mesh with a gear 31 of the reduction gearing located in the housing 32 attached to the top of the tank. This gearing is connected through a shaft 33, a friction clutch, an intermittent device and an eccentric 34 to the shaft 14 for operation.

The friction clutch means includes, as shown in Fig. 7, a disk 35 having a sleeve extending around a portion of the lower end of the shaft 33 and is keyed thereto by a key 36. The clutch means also includes an outer casing 37, a flexible disk 38 between the disk 35 and outer casing 37, a heavy spring 38$^a$ interposed between the upper end of the outer casing and a lock nut 38$^b$ secured to the sleeve of the disk 35.

The intermittent device includes a ratchet wheel 38$^c$ secured directly to the outer casing 37 but not to the shaft 33, and a pawl 39 carried by a link 39$^a$ pivoted upon the shaft 33 as shown in Figs. 4 and 7. The pawl is normally held in engagement with the ratchet wheel by the spring 40, but may be thrown out of engagement therewith by applying pressure upon the pin 41 so as to throw the spring to the other side of a center line passing through the pivot for the pawl and the fixed end of the spring 40. The link 39$^a$ is connected to a rod 42, the other end of which is connected to the eccentric 34 carried by the shaft 14 as shown in Figs. 4 and 5. Rotation of the eccentric reciprocates the pawl, thereby intermittently driving the ratchet wheel 38.

A handle 44 is connected for operation of the piston 4 through beveled gears 45, one of which is mounted on the shaft 33 and the other being carried by the same shaft 46, mounted in a bracket 47, to which the handle is attached through a pin and slot arrangement. The pin and slot are provided so that the handle may be easily removed when not in use.

Assuming that the tank is empty and the operator wishes to fill it and use the apparatus, he must first throw out the pawl 39, then attach the crank or handle 44 to the shaft 46 and rotate it in a contra-clockwise direction to raise the piston 4 into the cover of the tank, as shown in Fig. 3. The wing nuts 48 may then be loosened and the cover swung out of the way so that the cylinder 6 may be filled. The cover is then replaced, the wing nuts 48 tightened and the handle 44 turned in a clockwise direction to bring the piston 4 into contact with the lubricant in the cylinder 6. The handle 44 may now be removed as it is not needed again until the tank is empty. Also the pawl 39 should be snapped back into engagement with the ratchet wheel 38$^c$.

The driving mechanisms may now be set in motion by removing the wire 50 from the hook 51 and pushing the plugs 52 into a suitable electric outlet. This wire is connected to the switch 53 and when the button 54 is pushed by the operator, the current will be turned on at the motor 3 to set it in motion for driving the various parts of the mechanism. The shafts 28 and 29 will be driven at motor speed, but because of the reduction gearing in the housing 26 the shaft 14 will be driven at a much lower rate of speed.

As the shaft 14 turns the eccentric 34, secured thereto, rotates and reciprocates the rod 42 thereby operating the link 39$^a$ and the pawl 39 carried by the link. The pawl 39 being held in engagement with the teeth of the ratchet wheel 38$^c$ by the spring 40, will intermittently turn the outer casing 37 of the friction device and turn the shaft by means of the friction between the casing 37, flexible disk 38 and the disk 35 carried by the shaft 33. This shaft 33 will act through the gearing in the housing 32 (Figs. 3, 5 and 6) to drive the gear 31 at a relatively slow rate of speed so that the piston 4 will be fed downwardly against the lubricant to keep the lubricant always under pressure.

During the time that the piston 4 is being operated, the crankshaft 14ª is rotated to reciprocate the pistons 8 so that as the ports 7ª between the passages or cylinders 7 are uncovered by the pistons, the lubricant under pressure in the tank 2 will fill the passages 7. Then the pistons 8 will force the lubricant under relatively high potential pressure past the valves 9ᵇ into the chamber 5. The valves 9ᵇ act to prevent return of the lubricant after it has once been forced into the chamber 5.

While the apparatus continues in operation, the operator takes the gun 10 and hose 11 from the hook 55 and connects the nozzle of the gun to a lubricant-receiving part secured to a part to be lubricated (not shown) thereby opening a valve in the nozzle of the gun and permitting the lubricant to pass into the part to be lubricated. Thus it will be seen that the operator may pass quickly from one part of a machine or motor vehicle to another, and each time he applies the gun to the lubricant-receiving part, a supply of lubricant will be forced under relatively high pressure into the bearing.

During the operation of the apparatus, the plungers 8 work continuously, but the feed of the piston 4 is regulated by the friction mechanism so that the pressure in the tank 2 will build up to a predetermined point and then the friction disk 35 will slip relative to the casing 37 so that the feed of the piston will be temporarily stopped until the pressure of the lubricant in the chamber 5 has been reduced by using some of the lubricant therein. This arrangement provides a safety mechanism so that the cylinder or other parts of the apparatus will not be broken by an excess of pressure if the motor is allowed to run for any period of time without using the apparatus. A gauge 13ᶜ is connected to the pipe 13 so that the pressure in the chamber 5 will always be apparent.

The safety means between the operating mechanism of the pistons 8 and the pistons is the sliding arrangement by which the piston stems are connected to the sliding blocks 15. Thus during operation of the plungers 8, after the lubricant in the chamber 5 has reached a pressure sufficient to overcome the spring 23, the sliding blocks 15 will move forward relative to the piston stems and against the pressure of the springs without building up an excess of pressure. From the above description, it will be understood that the device is fool-proof and none of the mechanism can be harmed by failure to shut off the motor 3 when the device is not in use. Of course the operation of the motor will cease when the button 54ª of the snap switch is pressed to break the electrical circuit.

In Fig. 2 in dotted lines and Fig. 3 in cross-section, I have shown a cover 56 for the high pressure mechanism secured in place by a wing nut 57 screwed to a bolt 58 secured to the top of the support 16. This cover acts as a guard against anything getting caught in the working parts during operation.

While I have shown and described a preferred embodiment of my invention, it should be understood that changes involving omission, substitution, alteration and reversal of parts, and even changes in the mode of operation, may be made without departing from the scope of my invention, which is best defined in the following claims.

I claim:

1. Portable lubricating apparatus including a truck upon which the apparatus may be moved about, a tank providing a source of lubricant supply, a piston in said tank, means forming a chamber in communication with said tank, piston means interposed between the tank and the chamber for forcing lubricant into said chamber under relatively high pressure, valvular means preventing return of lubricant from said chamber, means for conducting the lubricant from said chamber to a part to be lubricated, power-driven means for continuous operation of said piston means and for intermittent operation of the piston in said tank to compress the lubricant therein and friction means interposed in the driving mechanism of the piston in the tank for preventing further operation of the piston in the tank after the lubricant in said tank has been compressed to a certain pressure without effecting the continued operation of the piston means for forcing the lubricant into said chamber while permitting operation of said piston after the pressure in the tank has been reduced.

2. Lubricating apparatus including a tank, means forming a high pressure chamber adapted to receive lubricant from said tank, piston means for compressing the lubricant in said tank, driving mechanism for operation of said piston, friction means interposed between the piston and driving mechanism for limiting the degree of compression of the lubricant in said tank while permitting continued operation of said driving mechanism, a high pressure chamber adapted to receive lubricant from said tank, piston means for forcing the lubricant to said chamber under relatively high pressure, driving mechanism for operating said last mentioned piston means and means interposed between said last mentioned piston means and driving mechanism for limiting the action of the piston means while the driving mechanism continues in operation.

3. Lubricating apparatus comprising, in combination, a lubricant supply tank, means for placing the lubricant in said tank under pressure, means forming a high pressure chamber, and piston means for forcing lubricant from said supply tank into said high pressure chamber, said means comprising a crank, a connecting rod driven from said crank, a cross head reciprocated by said connecting rod, a piston, tension means connecting said piston and said cross head for moving said piston in one direction, and yieldable compression means interposed between said piston and cross head for urging said piston in the opposite direction.

4. Lubricating apparatus comprising, in combination, a lubricant supply tank, means for placing the lubricant in said tank under pressure, means forming a high pressure chamber, a passage connecting the supply tank and the high pressure chamber, power operated piston means for forcing the lubricant through said passage into said chamber to build up a relatively high pressure in said chamber, valvular means for preventing return of lubricant from said high pressure chamber, said valvular means comprising a removable unit threaded into one wall of said chamber and a removable cover therefor in axial alignment therewith threaded into the opposite wall of said chamber.

In testimony whereof, I have signed my name to this specification.

MOSES F. CARR.